Patented Feb. 25, 1941

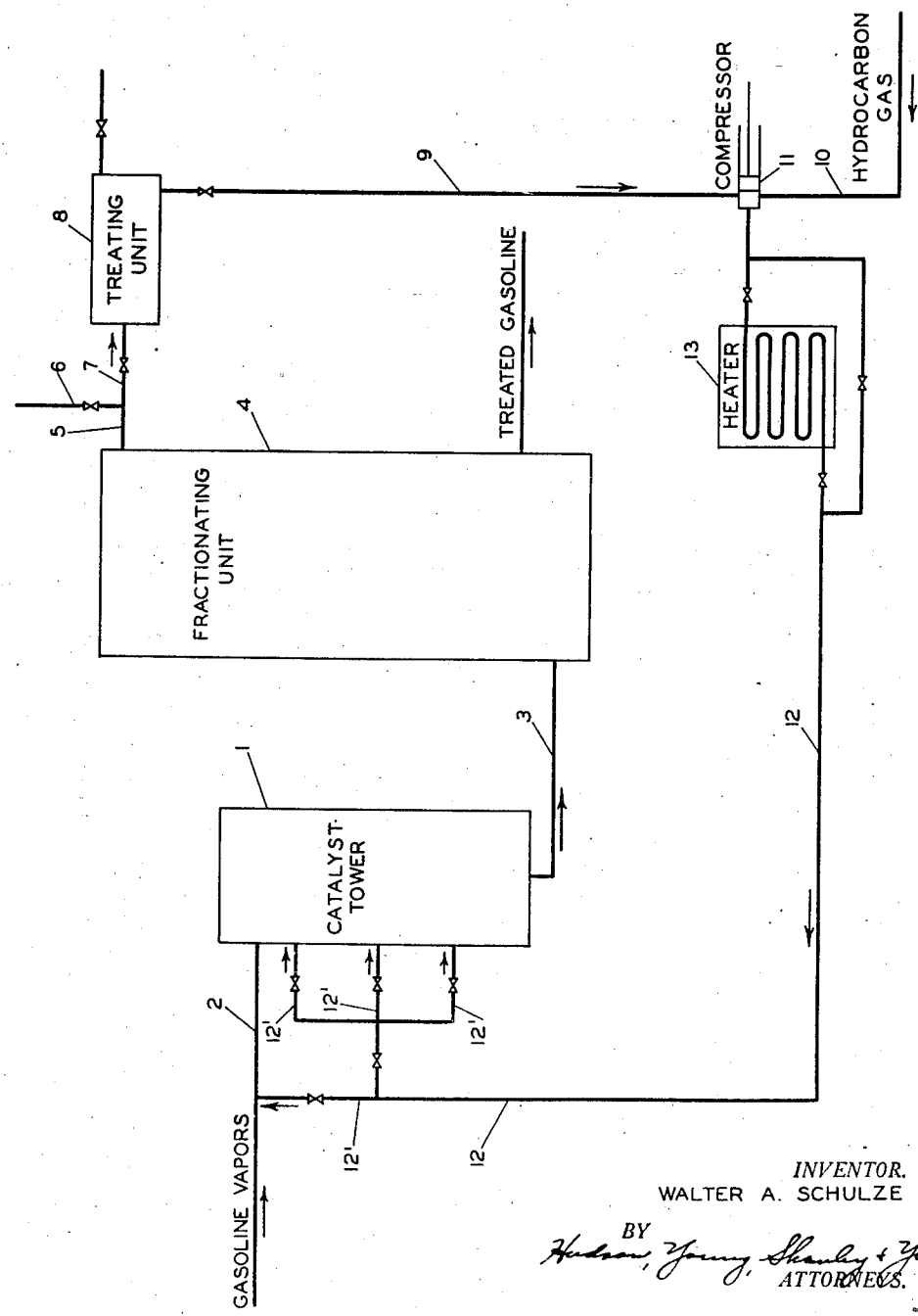

2,232,736

UNITED STATES PATENT OFFICE 2,232,736

PROCESS FOR TREATMENT OF HYDROCARBONS

Walter A. Schulze, Bartlesville, Okla., assignor to Phillips Petroleum Company, a corporation of Delaware Application October 20, 1936, Serial No. 106,698

2 Claims. (Cl. 196—50)

This invention relates to the art of treating hydrocarbons in the vapor form with solid contact catalysts and relates more particularly to the treatment of the lower boiling distillates produced by cracking heavier hydrocarbon oil mixtures and to vapor recovery and polymerized gasoline stocks though the process is applicable also to the treatment of similar distillates produced in the straight run distillation of petroleums, to natural gasoline and to other hydrocarbon materials.

In a more specific sense the invention has reference to a process for treating such motor fuel stocks to reduce their sulfur content, improve their antiknock characteristics and produce other desirable refining effects.

Many processes have been suggested heretofore for improving motor fuel stocks by contact with catalysts. In all of these processes, however, the catalyst becomes poisoned after a time by certain bodies either present in the vapors or formed by reaction between the catalyst and the hydrocarbon vapors and/or impurities in the vapors. I have found that the rate of poising of these catalysts varies greatly with the various gasoline stocks, some of them reducing the catalyst activity to an uneconomic level within a period of several hours or less. Highly cracked gasolines and pressure distillates, polymerized gasoline stocks and vapor recovery gasolines are especially bad in this connection.

An object of my invention is a process for treating these hydrocarbon vapors which rapidly poison contact catalysts, such vapors being referred to herein under the general term of cracked gasoline stocks, under such conditions that the gasoline produced therefrom has improved antiknock characteristics, a lowered sulfur content and other improved qualities.

Another object of my invention is a means for materially increasing the catalyst life and thereby effecting marked economies in the commercial practice of improving cracked gasoline stocks by treatment with contact catalysts. Further objects will be apparent as the disclosure proceeds.

My copending application Serial Number 104,303 now U. S. Patent 2,162,319 describes reducing poisoning of contact catalysts by employing certain high flow rates; my copending application Serial Number 104,306 now U. S. Patent 2,167,602 relates to improvement of octane number of motor fuels by treatment of a catalyst of the alumina type at high temperatures and flow rates; and my copending application Serial Number 106,697 now U. S. Patent 2,183,591 relates to the improvement of anti-knock characteristics of gasoline stock by contacting such stocks at relative high temperatures and flow rates with bauxite impregnated with chromium oxide.

Referring to the drawing, which is a diagrammatic showing of an apparatus for carrying out the process of the invention, reference numeral 1 indicates a catalyst tower which encloses a catalyst bed. Raw gasoline vapors are admitted to the catalyst bed through conduit 2 and are withdrawn at the bottom of the catalyst tower through conduit 3 to a fractionating unit 4. The overhead in the fractionating unit is taken off through conduit 5 having a branch 6 for conducting the overhead vapors and gases to further treatment and a branch 7 which may be used for conducting the overhead to a chemical treating unit for separating purified hydrocarbon gases for recycling through conduit 9. A suitable hydrocarbon gas, for example methane, alone or in mixture with other gases, inert under conditions of treatment, is brought into the system through conduit 10 and compressor 11. Conduit 9 connects with compressor 11 for recycling the hydrocarbon gases from the chemical treating unit 8. Conduit 12 carries the inert gas to the catalyst tower where its application to the vapors to be treated and the catalyst bed is controlled through branches 12'. A heater 13 is interposed in line 12 for adding heat to the inert gas when desired. Suitable valves are shown where needed to operate the apparatus in accordance with the invention.

I have found that in the treatment of cracked gasoline stocks the addition of a substantial proportion of so-called inert gases to the vapors prior to contact with the catalyst has certain decided advantages. These inert gases serve somewhat as diluents of the hydrocarbon vapors being treated and lower the percentage concentration of the various "potential" poisoning agents in the vapors.

The amount of polymers formed from the unsaturated hydrocarbons is markedly reduced when inert gases are added because of the lowered concentration of unsaturates in the vapors, hence the degradation of polymeric bodies to carbonaceous material and the like on and in the catalyst proceeds at a much reduced rate. Higher catalytic activity is, therefore, maintained over a much longer period of time.

In the desulfurization of cracked gasoline stocks at temperatures in the range of 500° to 800° F., the equilibrium for the decomposition of the organic sulfur compounds in cracked gasoline stocks to hydrogen sulfide has been found to be considerably more favorable when a substantial proportion of inert gases is added to the cracked gasoline vapors. The reaction, as exemplified by the aliphatic mercaptans, may be written as folows:

$$C_nH_{2n+1}SH \rightleftarrows H_2S + C_nH_{2n}$$
Mercaptan  Hydrogen sulfide  Olefin It is seen then that decreasing the concentration of olefins favors more complete dissociation of the mercaptans. This is of decided advantage where the gasoline stock is high both in unsaturated hydrocarbons and in hydrogen sulfide. Lower temperatures can be used, and/or higher pressures, if desired.

I have discovered too that the addition of inert gases to the cracked gasoline vapors substantially prevents the condensation of the high boiling components in the vapors from taking place when the vapors come into contact with the adsorbent catalytic material. In the processes used heretofore, the high boiling ends in cracked gasoline, pressure distillate or gas oil blends are condensed on the catalyst, thereby giving a liquid phase which aids and abets polymerization of unsaturated hydrocarbons, the polymers then poisoning the catalyst. To avoid this condensation, in certain instances superheating of the vapors above the normal treating temperature has been suggested. There are, however, certain disadvantages of such a superheating step, the principal one being that higher temperatures must be employed for treating and at such higher temperature cracking and/or polymerization proceeds at a higher rate, thereby tending to shorten catalyst life. In my process of adding inert gases to the petroleum vapors to avoid condensation of heavy ends on the catalyst, the temperature level need not be raised, in fact it may even be lowered somewhat, if desired. My process, therefore, permits taking the cracked gasoline vapors directly from the stills or the fractionating units and after adding the inert gases heated to the desired temperature, contacting the mixture with the catalyst.

I have found, too, that my present invention has decided advantages when treating gasoline stocks in the vapor form at temperatures of about 900° to 1200° F. over contact catalysts such as bauxite, as disclosed in my application Serial No. 104,306, filed October 6, 1936 now U. S. Patent 2,167,602. In the process described in this previous application, there are several concurrent reactions taking place among them being the dehydrogenation and rearrangement of certain of the hydrocarbon constituents of the vapors. This reaction is somewhat endothermic and in the operation of the process oftentimes a decided drop in temperature occurs within the catalyst bed, thereby retarding or stopping the reaction unless additional heat is provided by some means. If, however, my present invention is employed in this connection, i. e., adding a substantial proportion of inert gas to the vapors prior to treatment over the catalyst, then since the drop in temperature is proportional to the amount of hydrocarbons converted, the reduction in temperature will be proportionately less. In other words, a drop of 50° F. between the two ends of the catalyst bed may have no special disadvantages whereas a drop of 100° F. might render the process commercially inoperable. This drop in temperature can be brought by means of my present invention within any chosen temperature limits by varying the amount of inert gas to gasoline stock vapor. Instead of mixing the inert gases with the gasoline stock vapors prior to passage over the catalyst, if desired, the gases may be introduced into any particular section or part of the catalyst bed. The inert gases may also be heated to a temperature higher than the gasoline stock vapors, if desired, and in this way supply a portion of the endothermic heat required in the reaction of the gasoline stock vapors. Therefore, these inert gases offer various means of controlling the temperature within desired limits.

I have found also that when an inert gas such as methane is added to the gasoline stock vapors prior to this treatment over a catalyst of the bauxite type at a temperature of about 900° to 1200° F., and at a flow rate of 1 to 100 liquid volumes per hour per volume of catalyst the dehydrogenation and rearrangement reactions involving certain of the hydrocarbon constituents are decidedly favorably influenced and a gasoline product with superior antiknock qualities is produced. In the operation of this process high pressures are not needed, extremely good results being obtained in the range of atmospheric to 100 pounds per square inch.

Under the term of inert gases I mean those which do not undergo appreciable adverse change during the treating processes. For example, methane and/or the low boiling hydrocarbons constitutes a very desirable gas for the purposes enumerated. It is available around most refineries at an extremely low cost and it may be readily separated in the usual manner from the gasoline stock subsequent to the processing step. Hydrogen or hydrogen-bearing gases may be used if available at economic levels. The use of large percentages of such hydrogen gas may, however, influence the dehydrogenation reactions to some extent. In such processes, methane may have certain additional advantages over hydrogen. Light gases formed in liquid or vapor phase cracking of heavy oils may likewise be used to advantage under certain conditions. Obviously other inert gases also may be employed. This inert gas, or any portion thereof, with or without treatment to remove hydrogen sulfide and the like, may be recycled, if desired.

A modification of this invention includes also the blending or mixing of gasoline stocks consisting principally of saturated hydrocarbon, e. g., natural and straight run gasolines with gasoline stocks containing relatively high percentages of unsaturated hydrocarbons and readily polymerizable materials and then treating the mixture with the contact catalysts to reduce the sulfur content and improve the antiknock characteristics of the gasoline stocks. In this modification of my invention the catalyst life is greatly prolonged and the overall improvement in the combined gasoline stocks is markedly increased. In one specific example, straight run gasoline and vapor recovery gasoline were treated in separate units over bauxite catalyst to remove a substantial proportion of the organic sulfur compounds which are so deleterious to octane number and lead response. After processing 1,000 barrels of each of these gasolines per ton of catalyst, a 50–50 blend was made from the composite products. This was compared with the product obtained by treating 1,000 barrels of a 50–50 mixture of these gasolines per ton of catalyst under identical treating conditions. The desulfurized blend had a considerably lower sulfur content, a higher octane number and a greater lead response than the blended product made from the components desulfurized separately. The activity of the catalyst was not reduced nearly so fast by the blend as by the vapor recovery gasoline alone.

From the disclosure given herein, it is evident that inert gases also may be added to the blends of the various gasoline stocks as indicated above and additional advantages be obtained thereby.

The ratio of inert gases to gasoline stock vapors may be varied over wide ranges, of course, but in general to secure the maximum advantages the inert gases added to the vapors range from 5 to 75 per cent, depending on the gasoline stock being treated and on the conditions of treatment. Naturally, higher or lower quantities may be added and certain improvements be obtained.

Following treatment of the vapors through the catalyst the decomposed impurities and the inert gas may be removed in any conventional manner, as will be well understood by those skilled in the art.

The following example illustrates the beneficial effect obtained by adding methane gas to cracked gasoline stock vapors prior to treatment over bauxite catalyst.

Cracked gasoline stock vapors at a temperature of 1000° F. were diluted with two volumes of methane gas at 1000° F. and the mixture was then passed over bauxite catalyst at a pressure of 15 pounds per square inch gage and a flow rate equivalent to two liquid volumes of the cracked gasoline stock per hour per volume of catalyst space. The vapors leaving the catalyst chamber were at a temperature of 980° F. After the catalytic treatment the light gas and hydrogen sulfide were separated from the gasoline hydrocarbons. The composite gasoline from a 24 hour test run showed an improvement of 10 octane numbers, and the sulfur content was reduced from 0.12 to 0.06 per cent. The activity of the catalyst at the end of the run was approximately 75 per cent of the original activity.

In a comparable run the cracked gasoline vapors at a temperature of 1000° F. were passed without the addition of methane gas through bauxite catalyst under the same conditions of pressure and contact time as in the previous test wherein methane was used as a diluent. In this run the vapors leaving the catalyst tower were at a temperature of 950° F., showing a drop of 50° F. while passing through the catalyst tower. The gasoline on the same through-put basis showed an improvement of only 6 octane numbers and the sulfur content was reduced from 0.12 to only 0.88 per cent. The activity of the catalyst at the end of the run was less than 50 per cent of the original activity.

Obviously many modifications and variations of the invention, as hereinbefore set forth, may be made without departing from the spirit and the scope thereof, and therefore only such limitations should be imposed as are indicated in the appended claims.

I claim as my invention:

1. The process of supplying a portion of the endothermic heat and maintaining the temperature within a temperature range not exceeding 50° F. in the process of treating gasoline stock in the vapor form over bauxite catalyst at a flow rate of 1 to 100 liquid volumes per hour per volume of catalyst and a temperature of 900 to 1200° F., comprising the step of adding to the gasoline stock vapors after said vapors have passed through a portion of the catalyst bed a heated gas inert under the conditions of treatment and at a temperature above the temperature of the said gasoline stock vapors and in an amount in the range of 5 to 75 per cent of the mixture of gas and gasoline stock vapors, thereby maintaining the temperature within the range of 50° F. by supplying the needed endothermic heat.

2. The process of supplying a portion of the endothermic heat and maintaining the temperature within a temperature range not exceeding 50° F. in the process of treating gasoline stock in the vapor form over bauxite catalyst bed at a flow rate of 1 to 100 liquid volumes per hour per volume of catalyst and a temperature of 900 to 1200° F., comprising the step of adding to the gasoline stock vapors at a plurality of points in said catalyst bed a heated gas inert under the conditions of treatment and at a temperature above the temperature of the said gasoline stock vapors and in an amount in the range of 5 to 75 per cent of the mixture of gas and gasoline stock vapors, thereby maintaining the temperature within the range of 50° F. by supplying the needed endothermic heat.

WALTER A. SCHULZE.

CERTIFICATE OF CORRECTION.

Patent No. 2,232,736. February 25, 1941.

WALTER A. SCHULZE.

It is hereby certified that error appears in the printed specification of the above numbered patent requiring correction as follows: Page 1, first column, line 24, for "poising" read --poisoning--; page 3, second column, line 6, for "0.88" read --0.08--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.